United States Patent [19]

Bobrich et al.

[11] Patent Number: 5,169,721

[45] Date of Patent: * Dec. 8, 1992

[54] MAGNETIC RECORDING MEDIA COMPRISING A POLYURETHANE BINDER RESIN CONTAINING PERFLUORO GROUPS

[75] Inventors: Michael Bobrich, Boehl-Iggelheim; August Lehner, Roegersheim-Gronau; Albert Kohl, Laumersheim; Rudolf Suettinger, Heidelberg; Uwe Keppeler, Ludwigshafen; Werner Lenz, Bad Duerkheim; Roller Hermann, Ludwigshafen; Helmut Kopke, Weissenheim; Guenther Schulz, Bad Duerkheim, all of Fed. Rep. of Germany

[73] Assignee: BASF Aktiengesellschaft, Ludwigshafen, Fed. Rep. of Germany

[*] Notice: The portion of the term of this patent subsequent to Jun. 9, 2009 has been disclaimed.

[21] Appl. No.: 571,228

[22] Filed: Aug. 23, 1990

[30] Foreign Application Priority Data

Sep. 2, 1989 [DE] Fed. Rep. of Germany ....... 3929167

[51] Int. Cl.$^5$ ................................................ G11B 5/00
[52] U.S. Cl. .................................. 428/425.9; 428/694; 428/695; 428/900; 252/62.54
[58] Field of Search ............. 428/694, 695, 900, 425.9; 252/62.54

[56] References Cited

U.S. PATENT DOCUMENTS

| | | | |
|---|---|---|---|
| 2,871,218 | 1/1959 | Schollenberger | 260/45.4 |
| 3,810,874 | 4/1974 | Mitsch et al. | 260/75 H |
| 3,854,051 | 10/1974 | Zollinger | 260/248 CS |
| 3,972,856 | 8/1976 | Mitsch et al. | 260/77.5 |
| 4,085,137 | 4/1978 | Mitsch et al. | 260/561 HL |
| 4,094,911 | 6/1978 | Mitsch et al. | 260/615 A |
| 4,267,238 | 5/1981 | Chernega | 428/422 |
| 4,268,556 | 5/1981 | Pedrotty | 428/65 |
| 4,526,836 | 7/1985 | Mukai et al. | 428/421 |
| 4,559,118 | 12/1985 | Heil et al. | 204/159.14 |
| 4,568,612 | 2/1986 | Lehner et al. | 428/425.9 |
| 4,699,969 | 10/1987 | Re et al. | 528/70 |
| 4,775,595 | 10/1988 | Hasegawa | 428/425.9 |
| 4,842,939 | 6/1989 | Scarati et al. | 428/421 |

FOREIGN PATENT DOCUMENTS

| | | |
|---|---|---|
| 136102 | 4/1985 | European Pat. Off. . |
| 151877 | 6/1985 | European Pat. Off. . |
| 2500921 | 1/1980 | Fed. Rep. of Germany . |

OTHER PUBLICATIONS

JA Abstract 58/169 261 (corresponds to U.S. 4,526,836).
JA Abstract 58/141 438.
JA Abstract 60/160 020.
JA Abstract 57/092 428.

Primary Examiner—Paul J. Thibodeau
Assistant Examiner—Stevan A. Resan
Attorney, Agent, or Firm—Keil & Weinkauf

[57] ABSTRACT

Magnetic recording media consist of a nonmagnetic substrate and at least one magnetizable layer which is firmly applied thereon and is based on a polyurethane binder, not less than 50% by weight of the binder consisting of a high molecular weight branched polyurethane elastomer having OH-containing urea groups at the chain ends, and the frictional properties of the binder being improved and its coefficient of friction reduced by incorporation of perfluoro groups.

2 Claims, No Drawings

MAGNETIC RECORDING MEDIA COMPRISING A POLYURETHANE BINDER RESIN CONTAINING PERFLUORO GROUPS

The present invention relates to magnetic recording media, consisting of a nonmagnetic substrate and at least one magnetizable layer which is firmly applied thereon and is based on a polyurethane binder, not less than 50% by weight of the binder consisting of a high molecular weight branched polyurethane elastomer having OH-containing urea groups at the chain ends and the frictional properties of the binder being improved and friction reduced by the incorporation of perfluoro compounds.

In modern audio and video recording and playback apparatuses, magnetic recording media have to meet many different requirements. In addition to the high requirements for the recording and playback properties of audio tapes, video tapes and computer tapes, which are constantly being improved, there is a demand for constant improvement especially with regard to the mechanical properties of the recording media. Magnetic layers must be very flexible and have high resilience and high tensile strength. In addition, in order to avoid drops in output level, there is an increasing need to reduce the coefficients of friction and increase the abrasion resistance and resistance to wear.

The recording and playback properties of the magnetic recording systems can be improved, for example, by increasing the pigment volume concentration or by using magnetic material which is more finely divided. However, such measures have a permanent effect on the mechanical stability of the magnetic layer.

The patent literature describes man polyurethanes or polyurethane elastomers which are suitable for the production of magnetic recording media, for example DE-B 11 06 959, DE-B 25 00 921 or 24 42 763 or DE-B 27 53 694.

When these conventional binder systems are used, depending on the formation of the layer very high frictional forces and frequently also the stick-slip effect or squeal phenomena occur in the recording or playback of signals by means of magnetic recording media which are guided in contact with the head and also moved over guide rollers, guide pins or other guidance elements. Stick-slip denotes irregular tape transport, where the tape alternately stops and travels forward. Squeal is irregular tape transport where the speed of the tape is not constant but the tape does not come to a stop. The resulting abrasion affects both the life and the operational reliability.

The properties of magnetic recording media during continuous operation are thus greatly affected by the surface friction (sliding friction) of the magnetic layer. Hence, very low surface friction is desirable, without the recording or playback of signals being adversely affected.

It is therefore usual to add lubricants to the layer compositions of the magnetic recording media. Suitable lubricants for this purpose are a large number of different lubricants, such as polydimethylsiloxanes, liquid paraffins, waxes, saturated and unsaturated fatty acids, fatty esters, fatty amides, salts of fatty acids and solid lubricants, such as molybdenum sulfide, graphite, polytetraethylene powder and polytrichlorofluoroethylene powder. It has also been stated that, compared with the solid lubricants, liquid or pasty lubricants have the advantage that the surface to be lubricated is covered by a homogeneously thin surface film of these lubricants; the amount of lubricant added must be kept very small since otherwise the surface readily becomes tacky. However, these liquid lubricants frequently cannot be used as the sole lubricant and are therefore combined with solid or pasty lubricants. When liquid lubricants are used exclusively neither sticking nor blocking and sticking of the tapes can be permanently avoided in many fields of use, in particular during prolonged operation and under unfavorable climatic conditions.

For example, reducing the surface friction by adding silicone oil, as described in, for example, DE-B 877 213, leads to exudation of the lubricant and hence to sticking or blocking of individual magnetic layers, especially in the environmental test at 40° C. and 80% relative humidity.

When lubricants in the form of finely divided, insoluble hydrophobic solids or waxy substances are added, the lubricating effect is not uniform; instead, shortly after production, the solid particles are located only in limited areas at the surface and in the interior of the magnetic layer. These hydrophobic lubricants coat the generally hydrophilic magnetic material poorly if at all and are readily exuded, particularly under unfavorable climatic conditions, such as high temperature and high atmospheric humidity. This results in deposits on all parts which come into contact with the tape, in particular on the head, causing drops in output level.

Regardless of this, it was found that the known high molecular weight polyurethane elastomers as binders or in binder combinations can no longer meet the increasing quality requirements with regard to layer adhesion when both temperature and atmospheric humidity are increased, for example to 30°-60° C. at 80-100% relative humidity.

Many attempts have therefore been made to reduce the disadvantages of the high surface friction, which are present in the case of all magnetic tape binders, by adding low molecular weight or oligomeric perfluoro compounds.

However, improvement of the surface friction by the addition of perfluorinated compounds, as described in, inter alia, JP-A 60-160 020, 57-092 428 and DE-A 34 07 721, gives rise to the danger of exudation of the lubricants and hence sticking or blocking of individual magnetic layers, especially in the environmental test at 40° C. and 80% relative humidity. Although the application of oligomeric perfluorinated compounds as described in NL-A 71 11 865, NL-A 8000 060, U.S. Pat. No. 4,085,137, EP-A 136 102 and EP-A 151 877, indicates satisfactory behavior under conditions of high temperature and humidity, there is the danger of collection of the oligomeric constituents by the read head, with all problems typical for deposits on the read head, especially the deterioration in the electrical characteristics.

U.S. Pat. No. 4,526,836 and JP-A-58 169 261 describe the preparation and the use of fluorine-containing copolymers, but preferably from 30 to 90% by weight of these copolymers are used in combination with a curing agent. As a result, the mechanical properties of the magnetic tapes produced using this binder system are very unsatisfactory, preventing wide use in the various data media, for example HDC, audio, video or floppy disks. In JP-A 58 141 438, a fluorinated polyol which can be cured with polyisocyanates is likewise used as the binder, but the resulting magnetic layer has unsatisfactory running properties.

It is an object of the present invention to provide magnetic recording media, consisting of a non-magnetic substrate and at least one magnetizable layer which is firmly applied thereon and is based on magnetic material finely dispersed in a polymer binder and other customary additives, the said recording media having both improved resistance to wear and reduced coefficients of friction, even under unfavorable climatic conditions, but nevertheless not exhibiting disadvantageous blocking during operation of the recording media or exudation of lubricants.

We have found that this object is achieved by a magnetic recording medium, consisting of a nonmagnetic substrate and at least one magnetic layer which is firmly applied thereon and is based on a magnetic material finely dispersed in a binder consisting of not less than 50% by weight of a thermoplastic polyurethane, if the thermoplastic polyurethane used is a fluorine-containing, isocyanate-free, branched polyurethane which is soluble in tetrahydrofuran, has OH-containing urea groups at the chain ends and a molecular weight of from 25,000 to 150,000 and is prepared from A) 1 mole of a polyol having a molecular weight of from 400 to 4,000,
B) from 0.3 to 10 moles of a diol of 2 to 18 carbon atoms,
C) from 0.01 to 1 mole of a triol of 3 to 18 carbon atoms,
D) from 0.001 to 0.4 mole of a perfluoro compound having two terminal groups reactive to isocyanates and a molecular weight of from 300 to 4,000,
E) from 1.25 to 13 moles of a diisocyanate of 6 to 30 carbon atoms, the NCO : OH ratio in the sum of the components A, B, C and D being 0.95 : 1.0 to 1.1 : 1.0, and
F) from 0.05 to 2 moles of an OH-containing amine which is reactive to isocyanates.

In a further advantageous embodiment of the object according to the invention, component D consists of a reaction product of perfluorinated monoalcohols, monoamines or monocarboxylic acids of 4 to 20 carbon atoms with a triol, the groups of the perfluorinated compound which carry hydrogen atoms reactive to isocyanates being bonded to an OH group of the triol via a diisocyanate of 6 to 30 carbon atoms. This reaction can also be carried out in situ, the monofluoro compound being used as a mixture with diols and triols in the reactor in which the polymer is prepared. Preferred perfluorinated monoalcohols, monoamines or monocarboxylic acids are those having a linear chain. The $CF_2$ groups which promote sliding friction are thus incorporated along the polymer chain or in a short side chain.

To obtain special properties, it is advantageous if the polymer has an OH number of from 5 to 30, preferably from 10 to 25. The molecular weight (Mw) is from 25,000 to 150,000, corresponding to a K value (1% strength in dimethylformamide) of from 35 to 75. In synthesizing this polymer, it has proven advantageous if some, preferably more than 80%, in particular more than 90%, of the terminal OH groups consist of one of the following radicals:

—NH—CO—NR′—R—OH or

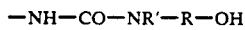

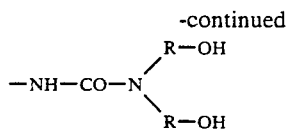

where R is —$(CH_2)_n$—R′ is —H, —$CH_3$ or —$(CH_2)_m$—$CH_c$, n is from 2 to 10 and m is from 1 to 10.

Polymers having this composition have better adhesive strength than those without these terminal groups. Consequently, it is also possible to increase the content of terminal OH groups with the result that, in the crosslinking with polyisocyanate, the degree of crosslinking can be varied within wide limits, meeting the requirements for the magnetic layer. The urea groups, which increase the dispersibility compared with the conventional magnetic materials, are also advantageous.

It was surprising that the adhesive strength was improved in spite of the perfluoro groups incorporated in the binder, although the contact angle of water with the binder film is greater than 96°.

The polyurethanes used according to the invention as binders in the magnetic layers have in general a hardness of from 20 to 130 s according to DIN 53,157. Furthermore, they have a modulus of elasticity (according to DIN 53,457) of from 50 to 2500 $Nmm^{-2}$, an elongation at break of greater than 70% (DIN 53,455) and a tensile strength of from 25 to 70 $Nmm^{-2}$ (DIN 53,455). The softening point is from 80° to 180° C. A pendulum hardness (DIN 53,157) of from 25 to 125 s, a modulus of elasticity of from 55 to 2000 $Nmm^{-2}$ and an elongation at break of from 80 to 500% and a tensile strength of from 25 to 50 $Nmm^{-2}$ are particularly advantageous.

The advantageous properties of the magnetic recording media having the composition according to the invention compared with those obtained using the conventional thermoplastic polyurethane elastomers are also clearly evident if a polyisocyanate is added before the dispersion is applied to the substrate. Many organic di-, tri- or polyisocyanates or isocyanate prepolymers having a molecular weight of not more than 10,000, preferably from 500 to 3,000, may be used for crosslinking. Polyisocyanates or isocyanate prepolymers which carry more than 2 NCO groups per the molecule are preferred. Polyisocyanates based on toluylene diisocyanate, hexamethylene diisocyanate or isophorone diisocyanate, which are formed by polyaddition to di- or triols or by biuret and isocyanurate formation, have proven particularly suitable. An adduct of toluylene diisocyanate with trimethylolpropane and diethylene glycol is particularly advantageous.

For the preparation of the polyurethanes, a polydiol having a molecular weight of from 400 to 4,000, preferably from 700 to 2,500, is used as component A. The known polyesterols, polyetherols, polycarbonatediols and polycaprolactonediols are suitable for this purpose.

The polyesterols are advantageously predominantly linear polymers having terminal OH groups, preferably those having two terminal OH groups. The acid number of the polyesterols is less than 10, preferably less than 3. The polyesterols can be prepared in a simple manner by esterifying aliphatic or aromatic dicarboxylic acids of 4 to 15, preferably 4 to 8, carbon atoms with glycols, preferably those of 2 to 25 carbon atoms, or by polymerization of lactones of 3 to 20 carbon atoms. Examples of suitable dicarboxylic acids are glutaric acid, pimelic acid, suberic acid, sebacic acid, dodecanoic acid and preferably adipic acid, succinic acid and phthalic acid. The dicarboxylic acids can be used individually or as mixtures. For the preparation of the polyesterols, it may be advantageous to use the corresponding acid derivatives, such as anhydrides or acyl chlorides, instead of the dicarboxylic acids. Suitable aromatic dicarboxylic acids are terephthalic acid, isophthalic acid or mixtures of these with other dicarboxylic acids, for example diphenic acid, sebacic acid, succinic acid and adipic acid. Examples of suitable glycols are diethylene glycol, 1,5-pentanediol, 1,10-decanediol and 2,2,4-trimethyl-1,5-pentanediol. 1,2-Ethanediol, 1,4-butanediol, 1,6-hexanediol and 2,2-dimethyl-1,3-propanediol, 1,4-dimethylolcyclohexane, 1,4-diethanolcyclohexane and ethoxylated/propoxylated products of 2,2-bis-(4-hydroxyphenylene)propane (bisphenol A) are preferably used. Depending on the desired properties of the polyurethanes, the polyols can be used alone or as a mixture in various ratios. Examples of suitable lactones for the preparation of the polyesterols are α,α-dimethyl-β-propiolactone, γ-butyrolactone and preferably ε-caprolactone.

The polyetherols are essentially linear substances which have terminal hydroxyl groups, contain ether units and possess a molecular weight of about 600–4,000, preferably 1,000–2,000. Suitable polyetherols can readily be prepared by polymerization of cyclic ethers, such as tetrahydrofuran, or by reacting one or more alkylene oxides, where the alkylene radical is of 2 to 4 carbon atoms, with an initiator which contains two bonded active hydrogen atoms in the alkylene radical. Examples of alkylene oxides are ethylene oxide, 1,2-propylene oxide, epichlorohydrin and 1,2- and 2,3-butylene oxide. The alkylene oxides can be used individually, alternately one after the other or as a mixture. Examples of suitable initiator molecules are water, glycols, such as ethylene glycol, propylene glycol, 1,4-butanediol and 1,6-hexanediol, amines, such as ethylenediamine, hexamethylenediamine and 4,4'-diaminodiphenylmethane, and amino alcohols, such as ethanolamine. Like the polyesterols, the polyetherols too can be used alone or in the form of mixtures. Polycarbonatediols are also suitable. Suitable polycarbonatediols are those with aromatic dihydroxy compounds, for example those based on 4,4'-hydroxydiphenyl-2,2-propane or those based on aliphatic dihydroxy compounds, e.g. 1,6-hexanediol. The molecular weights range from 500 to 4,000, preferably from 1,000 to 2,000.

Diols of 2 to 20, preferably 2 to 10, carbon atoms are used as building block B, for example 1,2-ethanediol, 1,3-propanediol, 1,4-butanediol, 1,6-hexanediol, 1,5-pentanediol, 1,10-decanediol, 2-methyl-1,3-propanediol, 2-methyl-2-butyl-1,3-propanediol, 2,2-dimethyl-1,4-butanediol, 2-methyl-2-butyl-1,3-propanediol, neopentylglycol hydroxypivalate, diethylene glycol, triethylene glycol and methyldiethanolamine, 1,4-dimethylolcyclohexane, 1,4-diethanolcyclohexane and ethoxylated/propoxylated products of bisphenol A (trade name Dianol). The diols can be used individually or as mixtures. Diamines of 2 to 15 carbon atoms, such as ethylenediamine, 1,6-hexamethylenediamine, 4,9-dioxododecane-1,12-diamine or 4,4'-diaminodiphenylmethane, or amino alcohols, e.g. monoethanolamine, monoisopropanolamine or 2-amino-2-methylpentan-2-ol, can also be used, in minor amounts. It has proven advantageous to incorporate the resulting urea groups in the polymer chain. The urea groups at the chain end are of minor importance.

The stated diols may furthermore be completely or partly replaced by water as building blocks B in the same manner.

Compounds of 3 to 18, preferably 3 to 6, carbon atoms are used as triols (building blocks C). Examples of corresponding triols are glycerol and trimethylolpropane. Low molecular weight reaction products of, for example, trimethylolpropane with ethylene oxide and/or propylene oxide are also suitable. The presence of triols in the polyaddition leads to branching of the end product, which has an advantageous effect on the mechanical properties of the polyurethane, unless local crosslinking occurs.

Linear alpha, omega-perfluoropolyetherdiols (e.g. Fomblin Z-DOL ® from Montefluos) having the composition

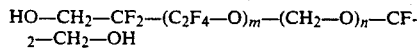

where m/n is 0.7±0.2, or a polyether-1,3-diol which has perfluoroalkylene terminal groups (e.g. Tegomer DF 1316 ® from Goldschmidt) and is of the formula

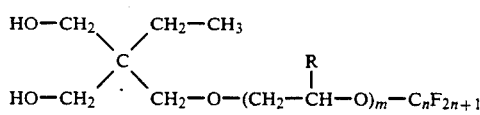

where R is $CH_3$ or $C_2H_5$, n is from 4 to 10 and m is from 1 to 30, as well as a reaction product prepared using molar ratios of a linear perfluorinated monoalcohol or monoamine of 4 to 20 carbon atoms and a diisocyanate of 6 to 30 carbon atoms and a triol or diol monoamine of 3 to 16 carbon atoms, of the formula

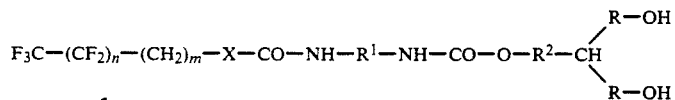

where n is from 1 to 18, m is 1 or 2, X is O or NH, $R^1$ is a diisocyanate radical, $R^2$ is $(-CH_2-)_x$, R is $(-CH_2-)_y$, x is from 0 to 5 and y is from 2 to 4, can be used as component D. The perfluoro component is present in the binder in an amount less then 5, preferably less than 3, % by weight based on the binder.

For the formation of the fluorine-containing polyurethanes or NCO-containing intermediates, the building blocks stated under A, B, C and D are reacted with aliphatic, cycloaliphatic or aromatic diisocyanates of 6 to 30 carbon atoms (building block E). For example, compounds such as toluylene 2,4-diisocyanate, toluylene 2,6-diisocyanate, m-phenylene diisocyanate, 4-chlorophenylene 1,3-diisocyanate, naphthylene 1,5-diisocyanate, hexamethylene 1,6-diisocyanate, cyclohexylene 1,4-diisocyanate, tetrahydronaphthylene 1,5-diisocyanate, diphenylmethane 4,4'-diisocyanate, dicyclohexylmethane 4,4'-diisocyanate or isophorone diisocyanate are suitable for this purpose. Fluorine-containing diisocyanates can also be used. These fluorine-containing diisocyanates may account for up to 32 mol percent of the total molar amount of diisocyanate.

For the formation of the OH-containing polyurethaneurea elastomers, the NCO-containing intermediate obtained from A to E is reacted with amino alcohols (of 2 to 16 carbon atoms). These amino alcohols of 2 to 16, preferably 3 to 6, carbon atoms include monoethanolamine, methylisopropanolamine, ethylisopropanolamine, methylethanolamine, 3-aminopropanol, 1-ethylaminobutan-2-ol, 4-methyl-4-aminopentan-2-ol and N-(2-hydroxyethyl)-aniline. Diolamines are particularly suitable since, as a result of their addition at the chain end, the OH number of the polymer is doubled. Diethanolamine and diisopropanolamine have proven particularly advantageous.

If no terminal OH groups are required, the reaction can be terminated when the desired molecular weight is reached by adding a monoalcohol or an amine, for example dibutylamine, diethylamine, butylamine, hexylamine, methanol or ethanol.

The thermoplastic, resilient OH-containing polyurethanes having this composition are prepared in solution by the two-stage process, in the presence or absence of catalysts and other assistants and/or additives. It is not possible to prepare these products by the solvent-free batch process. Since partial or complete formation of gel particles takes place owing to the presence of the triol and the reaction of amine with NCO groups in the polyaddition in the absence of a solvent, the reaction is carried out in a solvent. In general, the danger of local over-crosslinking, as occurs in polyaddition in the absence of a solvent, is avoided in the case of solution polyaddition.

In the 2-stage process, two different procedures are possible, depending on the reaction conditions (amount of solvent, heat of reaction).

Procedure 1: The diisocyanate is initially taken with a little solvent, after which building blocks A, B, C, D and, where relevant, the catalyst and the assistants and additives in solvents are added at from 20° to 90° C., preferably from 30° to 70° C., in the course of from 0.2 to 5 hours. The components are reacted until the desired NCO content is obtained, after which the stopping agent is added in the second stage.

Procedure 2: In this process, all starting components A to E are dissolved in some of the solvent to give solutions having a solids content of from 15 to 50% by weight. Thereafter, the stirred solutions are heated to 20°-90° C., preferably 30°-70° C., if necessary after the addition of a catalyst. The components are then reacted until the desired NCO content is obtained, after which the stopping agent is added in the second stage.

In the 2-stage process, NCO is used in excess relative to building blocks A to D in the first stage. In both procedures, it is possible to begin the reaction in some of the solvent and to add the remaining solvent during or after the reaction.

Preferred solvents for the preparation of the polyurethanes are cyclic ethers, such as tetrahydrofuran and dioxane, and cyclic ketones, such as cyclohexanone. Depending on the field of use, the polyurethanes can of course also be dissolved in other strongly polar solvents, such as dimethylformamide, N-methylpyrrolidone, dimethylsulfoxide or ethyleneglycol acetate. It is also possible to mix the stated solvents with aromatics, such as toluene or xylene, and esters, such as ethyl or butyl acetate.

Examples of suitable catalysts for the preparation of the polyurethanes and for the crosslinking reaction are tertiary amines, such as triethylamine, triethylenediamine, N-methylpyridine and N-methylmorpholine, metal salts, such as tin dioctoate, lead octoate and zinc stearate, and organic metal compounds, such as dibutyltin dilaurate or titaniumtetrabutylate. The suitable amount of catalyst is dependent on the activity of the relevant catalyst. In general, it has proven advantageous to use from 0.005 to 0.3, preferably from 0.01 to 0.1, parts by weight per 100 parts by weight of polyurethane.

The polyurethanes used according to the invention can be employed as sole binders for the production of magnetic layers; however, when magnetic recording media according to the invention are used for special purposes, it is advantageous to add a second binder component in amounts of from 5 to 50, preferably from 10 to 40, parts by weight, based on the resulting total amount of binder. The physically drying binders present in the binder mixture are known. These include a polyvinylformal binder which was prepared by hydrolysis of a polymer of a vinyl ester and subsequent reaction of the vinyl alcohol polymer with formaldehyde. The polyvinylformals advantageously contain not less than 65, in particular not less than 80, % by weight of vinylformal groups. Suitable polyvinylformals contain from 5 to 13% by weight of vinyl alcohol groups and from 80 to 88% by weight of vinylformal groups and have a specific gravity of about 1.2 and a viscosity of from 50 to 120 mPa.s measured at 20° C. using a solution of 5 g of polyvinylformal in 100 ml of 1 : 1 phenol/toluene. In addition to the polyvinylformal, vinyl chloride/diol mono- or di(meth)acrylate copolymers, which can be prepared, for example, in a known manner by solution copolymerization or suspension copolymerization of vinyl chloride and the diol monomethacrylate or monoacrylate, are also suitable. The diol mono- or diacrylate or -methacrylate used for this purpose is an esterification product of acrylic acid or methacrylic acid with the corresponding molar amount of an aliphatic diol of 2 to 4 carbon atoms, such as ethylene glycol, 1,4-butanediol or, preferably, propanediol, the propanediol preferably consisting of 1,3-propanediol and from 0 to 50% by weight of 1,2-propanediol. The copolymers advantageously have a vinyl chloride content of from 50 to 95% by weight and a diol acrylate or methacrylate content of from 5 to 50% by weight. Particularly suitable copolymers preferably contain from 70 to 90% by weight of vinyl chloride and from 10 to 30% by weight of diol monoacrylate or diol monomethacrylate. A 15% strength solution of particularly suitable copolymers, such as the vinyl chloride/propanediol monoacrylate copolymers, in a mixture of equal amounts by volume of tetrahydrofuran and dioxane has a viscosity of about 30 mPa.s at 25° C. The K value according to H. Fikentscher (Cellulosechemie 13 (1932), page 58 et seq.) of the particularly suitable products is from 30 to 50, preferably about 40.

Phenoxy resins whose constitution can be described by the repeating formula

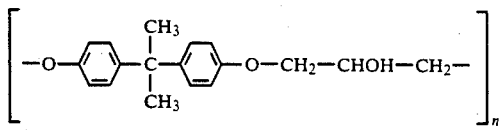

where n is roughly 100, can also advantageously be used. These are polymers such as those known under the trade names Epikote ® from Shell Chemical Co. or epoxy resin PKH ® from Union Carbide Corporation.

Cellulose ester binders are also suitable for use in the binder mixture defined. These are esterification products of cellulose with nitric acid or with carboxylic acids of 1 to 4 carbon atoms, e.g. cellulose acetate, cellulose triacetate, cellulose acetopropionate and cellulose acetobutyrate.

Further processing of the binder mixture with magnetic materials and assistants to give the novel magnetic recording media is carried out in a conventional manner.

Suitable anisotropic magnetic materials are the conventional pigments, which substantially influence the properties of the resulting magnetic layers, for example gamma-iron(III) oxide, finely divided magnetite, undoped or doped ferromagnetic chromium dioxide, cobalt-modified gamma-iron(III) oxide, barium ferrites or ferromagnetic metal particles. Acicular cobalt-modified or unmodified gamma-iron(III) oxide and ferromagnetic chromium dioxide and metal pigments are preferred. The particle size is in general from 0.2 to 2 μm, preferably from 0.3 to 0.8 μm.

The magnetic layers may also contain known additives, such as dispersants and also further lubricants in minor amounts, as well as fillers, which are admixed during dispersing of the magnetic pigments or during production of the magnetic layer. Examples of such additives are fatty acids or isomerized fatty acids, such as stearic acid or salts thereof with metals of main groups 1 to 4 of the Periodic Table of elements, amphoteric electrolytes, such as lecithin, and fatty esters or waxes, silicone oils, carbon black, etc. The amount of the additives is a conventional amount and is in general less than 6, preferably less than 3, in particular less than 1.5, % by weight, based on the magnetic layer.

The ratio of magnetic material to binder in the novel recording materials is from 1 to 10, in particular from 3 to 6, parts by weight of magnetic material to one part by weight of the binder mixture. Of particular advantage is the fact that, owing to the excellent pigment-binding capacity of the special polyurethanes, high concentrations of magnetic material in the magnetic layers are possible without the elastic properties being adversely affected or the performance characteristics suffering markedly.

The nonmagnetic and nonmagnetizable substrates used may be the conventional rigid or flexible substrates, in particular films of linear polyesters, such as polyethylene terephthalate, in general having thicknesses of from 4 to 200 μm, in particular from 6 to 36 μm. Recently, the use of magnetic layers on paper substrates for electronic computing and accounting machines has also become important; the novel coating materials can advantageously be used for this purpose too.

The novel magnetic recording media can be produced in a known manner. Advantageously, the magnetic pigment dispersion prepared in a dispersing apparatus, for example a tubular ball mill or stirred ball mill, from the magnetic material and a solution of the binder, with the addition of dispersants and other additives, is filtered, after the polyisocyanate crosslinking agent has, if necessary, been mixed in, and is applied to the nonmagnetic substrate. As a rule, magnetic orientation is effected before the liquid coating mixture is dried on the substrate; the latter procedure is advantageously carried out in from 10 to 200 s at from 50° to 90° C. The magnetic layers can be calendered and compacted on conventional apparatuses by passage between heated and polished rollers, if necessary with the use of pressure and temperatures of from 25° to 100° C., preferably from 60° to 80° C. In the case of crosslinking binders, it has proven very advantageous to carry out calendering before crosslinking is complete, since the OH polymers in the uncrosslinked state are very thermoplastic without being tacky. The thickness of the magnetic layer is in general from 0.5 to 20 μm, preferably from 1 to 10 μm. In the case of the production of magnetic tapes, the coated films are slit in the longitudinal direction into the usual widths, generally specified in inches.

Without additional lubricants or with a greatly reduced amount of added lubricant, the novel magnetic recording media exhibit lower sliding friction compared with magnetic recording media which have been obtained using prior art polyurethanes or polyurethane mixtures. Their surface hardness, which is nevertheless great, and the high modulus of elasticity, which decrease by less than 50% even at 50° C., are further advantageous properties of the novel recording media. Moreover, all requirements set are fulfilled in the durability test and especially in the environmental test (at 40° C. and 80% relative humidity). It was also surprising that the novel magnetic recording media did not show poorer adhesion of the binder-containing magnetic layer to the conventional substrates compared with conventional magnetic tape binders without the incorporation of a friction-reducing component, this being the case even under difficult climatic conditions.

In the Examples and Comparative Experiments which follow, parts and percentages are by weight, unless stated otherwise. Parts by volume bear the same relation to parts by weight a that of the liter to the kilogram.

Polymer A

In a heatable reaction vessel having a capacity of 150,000 parts by volume and equipped with a stirrer and reflux condenser, 7,875 parts of a polyesterdiol obtained from adipic acid and 1,4-butanediol (molecular weight about 1,000), 450 parts of a polyfluoropolyetherdiol (molecular weight about 2,400), 911 parts of 1,4-butanediol, 50 parts of trimethylolpropane and 4,828 parts of diphenylmethane 4,4'-diisocyanate are dissolved in 57,026 parts of tetrahydrofuran and the solution is heated to about 55° C. The components are reacted to a final viscosity of 1 Pa.s (at 60° C.), and the mixture is then diluted to a solids content of 12.5% with 42,770 parts of tetrahydrofuran. The NCO content is 0.07%. At the same time, the reaction is stopped by adding 142 parts of diethanolamine. The K value of the polymer formed is 62, measured using a 1% strength solution in dimethylformamide.

Polymer B

In a heatable reaction vessel having a capacity of 150,000 parts by volume and equipped with a stirrer and reflux condenser, 7,875 parts of a polyesterdiol obtained from adipic acid and 1,4-butanediol (molecular weight about 1,000), 135 parts of a polyfluoropolyetherdiol (molecular weight about 2,400), 923 parts of 1,4-butanediol, 50 parts of trimethylolpropane and 4,828 parts of diphenylmethane 4,4,-diisocyanate are dissolved in 55,814 parts of tetrahydrofuran and the solution is heated to about 55° C. The components are reacted to a final viscosity of 1 Pa.s (at 60° C.). The NCO content is 0.08%. The mixture is then diluted to a solids content of 12.5% with 41,860 parts of tetrahydrofuran. At the same time, the reaction is stopped by adding 142 parts of diethanolamine. The K value of the polymer formed is 59, measured using a 1% strength solution in dimethylformamide.

Polymer C

The procedure described for polymer A is followed, except that, instead of the perfluoroetherdiol, an equivalent amount of the polyesterdiol is used.

Polymer D

The procedure described for polymer B is followed, except that, instead of the perfluoroetherdiol, an equivalent amount of the polycarbonatediol is used.

EXAMPLE 1

100,000 parts of steel balls, 16,000 parts of a 12.5% strength solution of polymer A, 10,000 parts of a 10% strength solution of a polyvinylformal, consisting of 82% of vinylformal units, 12% of vinyl acetate units and 6% of vinyl alcohol units, 135 parts of zinc stearate and 13,500 parts of a ferromagnetic chromium dioxide pigment having a mean particle size of 0.5 μm and a length/width ratio of from 4 : 1 to 9 : 1 and 4,500 parts of tetrahydrofuran are introduced into a steel ball mill having a capacity of 100,000 parts by volume and operated at about 40 revolutions per minute, and are dispersed for about 120 hours. The magnetic dispersion is then filtered under pressure through a filter of 5 μm pore size. A 20 μm thick polyethylene terephthalate film is coated with the magnetic dispersion by the conventional method using a knife coater and, after passing through a magnetic field, the coating is dried at from 60° to 100° C. The magnetic layer is compacted and calendered by passage between heated rollers (70° C., nip pressure 200 kg/cm). The resulting thickness is 5 μm. The coated film is then slit into tapes 3.81 mm wide.

The magnetic tapes are subjected to the following tests:

Test 1

Coefficient of friction layer/steel, before/after continuous operation

The coefficients of friction are determined according to DIN 45,522, Sheet 1, and are measured for the unused tap and after the tape has been subjected to continuous use.

Test 2

Quasistatic friction

The coefficient of friction is determined by measuring the tensile force produced as a result of friction by a magnetic tape passing over a stationary measuring drum. The measuring drum is a steel drum having a surface roughness of about 0.15 μm and a diameter of 70 mm. The piece of tape is 25 cm long and is passed over the drum under a tension of 20 cN at a speed of 1 mm/sec and at an angle of wrap of 180° C. The tension at the load cell F is a measure of the coefficient of friction μ, in accordance with $$\mu = \frac{1}{\pi} \times \ln \frac{F}{20}$$

(Test conditions: 23° C., 50% relative humidity).

Test 3

Dynamic friction

The coefficient of friction is determined as in Test 2, except that the magnetic tape is passed over a measuring drum rotating at a peripheral velocity of 9.5 cm/sec.

Test 4

Abrasion in continuous operation

This measurement is used to evaluate the abrasion properties of a tape. The abrasion in the form of a weight loss of a tape loop in mg is measured. The loop length is 95 cm, the tape speed 4 mm/sec, the tape tension 35 cN and the running time 1 hour, at an ambient temperature of 23° C. and a relative humidity of 50%.

The results are shown in the Table.

EXAMPLE 2

The procedure described for Example 1 is followed, except that polymer B is used instead of polymer A.

COMPARATIVE EXPERIMENT 1

The procedure described in Example 1 is followed, except that polymer C was used instead of polymer A. The results are shown in the Table.

COMPARATIVE EXPERIMENT 2

The procedure described in Example 2 was followed, except that polymer D was used instead of polymer B. The results are shown in the Table.

TABLE

| | Examples | | Comparative Experiments | |
|---|---|---|---|---|
| | 1 | 2 | 1 | 2 |
| Test 1 before continuous operation | 0.25 | 0.29 | 0.45 | 0.53 |
| Test 1 after continuous operation | 0.28 | 0.29 | 0.58 | 0.61 |
| Test 2 | 0.21 | 0.25 | 0.35 | 0.37 |
| Test 3 | 0.23 | 0.25 | 0.52 | 0.49 |
| Test 4 | 0.2 | 0.21 | 4.6 | 3.2 |

We claim:

1. A magnetic recording medium, consisting of a non-magnetic substrate and at least one magnetic layer which is applied firmly thereon and is based on a magnetic material finely dispersed in a binder consisting of not less than 50% by weight of a thermoplastic polyurethane, wherein the thermoplastic polyurethane used is a fluorine-containing, isocyanate-free, branched polyurethane which is soluble in tetrahydrofuran, has OH-containing urea groups at the chain ends and a molecular weight of from 25,000 to 150,000 and is prepared from
   A) 1 mole of a polyol having a molecular weight of from 400 to 4,000, B) from 0.3 to 10 moles of a diol of 2 to 18 carbon atoms,
C) from 0.01 to 1 mole of a triol of 3 to 18 carbon atoms,
D) from 0.001 to 0.4 mole of a perfluoro compound having two terminal groups reactive to isocyanates and a molecular weight of from 300 to 4,000,
E) from 1.25 to 13 moles of a diisocyanate of 6 to 30 carbon atoms, the NCO : OH ratio in the sum of the components A, B, C and D being 0.95 : 1.0 to 1.1 : 1.0, and
F) from 0.05 to 2 moles of an OH-containing amine which is reactive to isocyanates,
said perfluoro compound being present in the binder in an amount of less than 3% by weight, based on the binder.

2. A magnetic recording medium, consisting of a non-magnetic substrate and at least one magnetic layer which is applied firmly thereon and is based on a magnetic material finely dispersed in a binder consisting of not less than 50% by weight of a thermoplastic polyurethane, wherein the thermoplastic polyurethane used is a fluorine-containing, isocyanate-free, branched polyurethane which is soluble in tetrahydrofuran, has OH-containing urea groups at the chain ends and a molecular weight of from 25,000 to 150,000 and is prepared form
A) 1 mole of a polyol having a molecular weight of from 400 to 4,000,
B) from 0.3 to 10 moles of a diol of 2 to 18 carbon atoms,
C) from 0.01 to 1 mole of a triol of 3 to 18 carbon atoms,
D) from 0.001 to 0.4 mole of a perfluoro compound having two terminal groups reactive to isocyanates and a molecular weight of from 300 to 4,000,
E) from 1.25 to 13 moles of a diisocyanate of 6 to 30 carbon atoms, the NCD : OH ratio in the sum of the components A, B, C and D being 0.95 : 1.0 to 1.1 : 1.0, and
F) from 0.05 to 2 moles of an OH-free monoamine which is reactive to isocyanates,
said perfluoro compound being present in the binder in an amount of less than 3% by weight, based on the binder.

* * * * *

UNITED STATES PATENT AND TRADEMARK OFFICE
CERTIFICATE OF CORRECTION

PATENT NO. : 5,169,721

DATED : December 8, 1992

INVENTOR(S) : BOBRICH et al.

It is certified that error appears in the above-identified patent and that said Letters Patent is hereby corrected as shown below:   On the title page: Item [75]

under Inventors: "Roller Hermann" should read -- Hermann Roller -- claim 2, column 14, line 3: "form" should read -- from -- claim 2, column 14, line 14: "NCD" should read -- NCO --

Signed and Sealed this

Twenty-sixth Day of October, 1993

Attest:

BRUCE LEHMAN

Attesting Officer                Commissioner of Patents and Trademarks